United States Patent
McCarty et al.

(10) Patent No.: US 12,046,381 B2
(45) Date of Patent: Jul. 23, 2024

(54) METHODS AND DEVICES TO IMPROVE PERFORMANCES OF RCCA AND CEA TO MITIGATE CLAD STRAIN IN THE HIGH FLUENCE REGION

(71) Applicant: Westinghouse Electric Company LLC, Cranberry Township, PA (US)

(72) Inventors: Jeffrey M. McCarty, Cayce, SC (US); Thanh H. Do, Columbia, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 362 days.

(21) Appl. No.: 17/353,016

(22) Filed: Jun. 21, 2021

(65) Prior Publication Data

US 2022/0406477 A1    Dec. 22, 2022

(51) Int. Cl.
    *G21C 7/10*    (2006.01)
    *G21C 7/103*    (2006.01)
    *G21C 7/117*    (2006.01)

(52) U.S. Cl.
    CPC ............ *G21C 7/117* (2013.01); *G21C 7/10* (2013.01); *G21C 7/103* (2013.01)

(58) Field of Classification Search
    CPC .......... G21C 7/117; G21C 7/103; G21C 7/14; G21C 3/336; G21C 3/00; G21C 7/10; G21C 3/17; G21C 3/18
    See application file for complete search history.

(56) References Cited

U.S. PATENT DOCUMENTS

| | | | |
|---|---|---|---|
| 4,699,756 A | 10/1987 | Nguyen | |
| 4,814,137 A * | 3/1989 | Beuchel | G21C 3/28 |
| | | | 976/DIG. 57 |

(Continued)

FOREIGN PATENT DOCUMENTS

| | | |
|---|---|---|
| CN | 101567226 A | 10/2009 |
| CN | 106796821 A | 5/2017 |

(Continued)

OTHER PUBLICATIONS

Hoffman et al. Control Rod For Influencing The Reactivity of a Nuclear Reactor, And Arrangement of a Plurality of These Control Rods As a Control Element, EP 0364910 A2 (Year: 1990).*

(Continued)

*Primary Examiner* — Sharon M Davis
(74) *Attorney, Agent, or Firm* — K&L Gates LLP

(57) ABSTRACT

The present disclosure is generally related to methods, devices and systems for improving the performances of a Rod Cluster Control Assembly (RCCA) and/or a Control Element Assembly (CEA) to mitigate clad strain, especially in the high fluence region, during normal operation conditions and accident conditions. One method may include incorporating a device such as a powder collection and blockage device between the ceramic upper and ceramic lower absorber materials of the RCCA and/or CEA. Another method may include increasing the plenum volume by incorporating an axial hole into the top end plug extension. Another method may include increasing the plenum volume by incorporating an axial hole into the bottom end plug and optionally incorporating radial grooves in the bottom of the lower absorber material to provide a flow channel for gas expansion or generation to ensure that the lower absorber does not block the opening in the bottom end plug.

20 Claims, 11 Drawing Sheets

(56) References Cited

U.S. PATENT DOCUMENTS

| | | | |
|---|---|---|---|
| 6,005,906 A | 12/1999 | Van Swam | |
| 9,202,601 B2 | 12/2015 | Bertch | |
| 2001/0033632 A1* | 10/2001 | Murakami | G21C 7/10 376/327 |
| 2006/0176995 A1 | 8/2006 | Cahill | |
| 2009/0238322 A1 | 9/2009 | Liu et al. | |
| 2011/0311015 A1* | 12/2011 | Ziaei | G21C 3/04 140/71 C |
| 2016/0099080 A1 | 4/2016 | Choi et al. | |

FOREIGN PATENT DOCUMENTS

| | | |
|---|---|---|
| EP | 0364910 B1 | 10/1993 |
| JP | S62291593 A | 12/1987 |
| JP | H02140693 A | 5/1990 |
| TW | 338830 B | 8/1998 |

OTHER PUBLICATIONS

Echigoya et al. Fuel Rod For Nuclear Reactor, JP 62291593 A (Year: 1987).*

International Search Report and Written Opinion for International PCT Application No. PCTU.S. Pat. No. 202207301221, dated Jul. 21, 2023.

Search Report in corresponding Taiwanese Application No. 111123087; dated Jul. 4, 2023.

* cited by examiner

METHODS AND DEVICES TO IMPROVE PERFORMANCES OF RCCA AND CEA TO MITIGATE CLAD STRAIN IN THE HIGH FLUENCE REGION

FIELD

The present disclosure is generally related to methods, devices and systems for improving the performances of a Rod Cluster Control Assembly (RCCA) and a Control Element Assembly (CEA) to mitigate clad strain in the high fluence region during normal operation conditions and accident conditions.

SUMMARY

The following summary is provided to facilitate an understanding of some of the innovative features unique to the aspects disclosed herein, and is not intended to be a full description. A full appreciation of the various aspects can be gained by taking the entire specification, claims, and abstract as a whole.

In various aspects, methods, devices and systems for improving the performances of a Rod Cluster Control Assembly (RCCA) and a Control Element Assembly (CEA) to mitigate clad strain in the high fluence region during normal operation conditions and accident conditions are disclosed herein. One method may include incorporating a device such as a powder collection and blockage device between an upper and a lower absorber materials of the RCCA and/or CEA. Another method may include increasing the plenum volume by incorporating an axial hole into a top end plug. Another method may include increasing the plenum volume by incorporating an axial hole into the bottom end plug and optionally incorporating radial grooves in the bottom of the lower absorber material to provide a flow channel for gas expansion or generation to ensure that the lower absorber material does not block the opening in the bottom end plug.

In various aspects, a Rod Cluster Control Assembly (RCCA) or a Control Element Assembly (CEA) of a nuclear reactor for mitigating clad strain is disclosed herein.

In various aspects, a Rod Cluster Control Assembly (RCCA) or a Control Element Assembly (CEA) of a nuclear reactor may comprise a device which improves the performances of the RCCA to mitigate clad strain, for example, the clad strain in the high fluence region of the RCCA or the CEA.

In various aspects, the RCCA or the CEA may comprise: at least one control rod including a clad, the clad including a upper section and a lower section. In various aspects, the at least one control rod may comprise an absorber material housed inside the clad, the absorber material comprising an upper absorber material housed inside the upper section of the clad and a lower absorber material housed in the lower section of the clad; and the device. In an embodiment, the device may be housed inside the clad.

In various aspects, the control rod may be configured to have a first space gap between the upper material and the clad; and a second space gap between the lower absorber material and clad. In an embodiment, the first space gap is the same as the second space gap, and both are annular space gap.

In various aspects, the device may be a powder collection and blockage device. In an embodiment, the powder collection and blockage device may be housed inside the clad and incorporated into the upper or the lower absorber materials in the clad of the RCCA or the CEA. In an embodiment, the powder collection and blockage device may be housed inside the clad between the upper and lower absorber materials.

In various aspects, the RCCA or the CEA may further comprise one or more powder collection and blockage devices incorporated into the upper absorber material. In an embodiment, the one or more powder collection and blockage devices may be distributed evenly in the upper absorber material along a length of the clad or the at least one control rod. Each of the powder collection and blockage devices collects the powder of the absorber material generated above each of the devices respectively during normal operation time and also during beyond design basis (BDB) accident time of the RCCA or the CEA to reduce the accumulation of the powder of the absorber material in the bottom of the RCCA or the CEA or the bottom end of the clad. In an embodiment, the one or more powder collection and blockage devices may be distributed evenly or at different intervals in the upper absorber material along an axial length of the clad or the at least one control rod.

In various aspects, the RCCA or the CEA may further comprise one or more powder collection and blockage devices incorporated into and distributed evenly or at different intervals in the lower absorber material along the axial length of the clad or the at least one control rod.

In various aspects, the RCCA or the CEA may further comprise at least one powder collection and blockage device incorporated in the upper absorber material inside the clad; and at least one powder collection and blockage device incorporated in the lower absorber material inside the clad.

In various aspects, the RCCA or the CEA may comprise multiple powder collection and blockage devices incorporated into the absorber material inside the clad, and may distributed evenly or at different intervals along the axial length of the clad or the at least one control rod.

In various aspects, the powder collection and blockage device may comprise: a spacer and a garter spring. In an embodiment, the spacer is configured to retain the garter spring, provides a bearing surface between the upper and lower absorber materials, and provides an open axial space for collection of a powder of the upper absorber material generated during normal operation conditions and also accident conditions of the RCCA or the CEA. In an embodiment, to compensate for thermal and irradiation expansion of the clad and for clad creep down due to external pressure, an outward force of the garter spring keeps the garter spring held tightly against an inside wall of the clad to keep the powder from passing down in the clad on the outside of the garter spring.

In various aspects, the garter spring may have closely spaced coils and prevents the powder from passing down the clad, for example passing down from the upper section to the lower section of the clad, but does not prevent backfill gases and gases generated during irradiation from moving through the control rod.

In various aspects, the garter spring may have a coarse spring coil pitch which is too coarse to block the powder. In an embodiment, the powder collection and blockage device may further comprise a fine mesh screen. The garter spring is configured to keep the screen mesh to be held tightly against the inside wall of the clad to prevent formation of a cap between the screen mesh and the inside wall of the clad and thus to prevent the powder from passing down the clad, for example, passing down from the upper section to the lower section of the clad on the outside of the garter spring or the screen mesh.

In various aspects, the powder collection and blockage device further comprises a screen mesh configured to be inserted on top of the garter spring, and the garter spring is configured to keep the screen mesh held tightly against the inside wall of the clad to prevent the formation of a gap between the screen mesh and the inside wall of the clad.

In various aspects, the screen mesh has a diameter that closely matches the inner diameter of the clad, and a mesh size fine enough to prevent powder from passing through it.

In various aspects, the upper absorber material is a ceramic absorber material.

In various aspects, the upper absorber material is boron nitride ($B_4C$).

In various aspects, the lower absorber material is a ceramic absorber material.

In various aspects, the lower absorber material is boron nitride ($B_4C$).

In various aspects, the spacer is made of a material selected from the group consisting of 304 stainless steel, a nickel based alloy, Inconel 625, Inconel 718, a ceramic absorber material, and $B_4C$ absorber material.

In various aspects, the garter spring is made of a material selected from the group consisting of 304 stainless steel, a nickel based alloy, Inconel 625, and Inconel 718.

In various aspects, the screen mesh is made of a material selected from the group consisting of 304 stainless steel, a nickel based alloy, Inconel 625, and Inconel 718.

In various aspects, a Rod Cluster Control Assembly (RCCA) or a CEA of a nuclear reactor for mitigating clad strain is disclosed herein. In various aspects, the RCCA or the CEA may comprise: at least one control rod. The at least one control rod comprises a clad, the clad having an upper end and a lower end; an absorber material housed inside the clad; a spring housed inside the clad; and a plenum housed inside the clad and further inside the spring. The RCCA or the CEA may further comprise a bottom end plug configured to attach to the lower end of the clad; a top end plug configured to attach to the upper end of the clad; and an axial hole into the top end plug, wherein the axial hole into the top end plug increases a plenum volume of the RCCA or the CEA.

In various aspects, a Rod Cluster Control Assembly (RCCA) or a CEA of a nuclear reactor for mitigating clad strain is disclosed herein. In various aspects, the RCCA may comprise: at least a control rod. In various aspects, the control rod may comprise a clad including an upper end and a lower end; an absorber material housed inside the clad; a spring housed inside the clad; and a plenum housed inside the clad and further inside the spring. In various aspects, the RCCA or the CEA may further comprise a bottom end plug configured to attach to the lower end of the clad; a top end plug configured to attach to the upper end of the clad; and an axial hole into the bottom end plug, wherein the axial hole into the bottom end plug increases a volume of the plenum.

In various aspects, the Rod Cluster Control Assembly (RCCA) or the CEA may further comprise radial grooves in a bottom of the lower absorber material to provide a flow channel for gas expansion or generation to ensure that the lower absorber material does not block an opening in the bottom end plug.

In various aspects, a Control Element Assembly (CEA) of a nuclear reactor for mitigating clad strain is disclosed herein. In various aspects, the Control Element Assembly (CEA) may comprise one or more, or all the features of the Rod Cluster Control Assembly (RCCA) disclosed herein above.

In various aspects, a method for mitigating clad strain in a RCCA or a CEA of a nuclear reactor is disclosed here. In various aspects, the method may comprise: providing the RCCA or the CEA, wherein the RCCA or the CEA comprises one or more, or all of the features of the RCCA or CEA disclosed herein above.

In various aspects, the RCCA or the CEA may comprise: at least one control rod comprising: a clad including a upper section and a lower section; an upper absorber material housed inside the upper section of the clad, a lower absorber material housed in the lower section of the clad. The method may further comprise incorporating a device inside the clad between the upper and lower absorber materials. In various aspects, the device may be a powder collection and blockage device. In various aspects, the powder collection and blockage device may comprise: a spacer; and a garter spring. In various aspects, the spacer retains the garter spring, provides a bearing surface between the upper and lower absorber materials, and provides an open axial space for collection of a powder of the upper absorber material generated during normal operation conditions and accident conditions. In various aspects, the outward force of the garter spring keeps the spacer and the garter spring held tightly against an inside wall of the clad to keep powder from passing on the outside of the garter spring from the upper section to the lower section of the clad. In various aspects, the garter spring has closely spaced coils and prevents the powder from passing from the upper section to the lower section of the clad but does not prevent backfill gases and gases generated during irradiation from moving through the control rod.

In various aspects, the at least one control rod is configured to have an annular space gap between the upper absorber material and an inner wall of the clad; and the same annular space gap between the lower absorber material and the inner wall of the clad. In various aspects, these space gaps can provide enough room for thermal and irradiation expansion of the absorber materials including the upper and lower absorber materials.

In various aspects, the method may further comprise incorporating one or more of the powder collection and blockage devices into the upper absorber material inside the upper section of the clad.

In various aspects, the method may further comprise incorporating one or more of the powder collection and blockage devices into the lower absorber material inside the lower section of the clad.

In various aspects, the method may further comprise distributing the powder collection and blockage devices in the absorber material evenly along an axial length of the clad.

In various aspects, a method for mitigating clad strain in a Rod Cluster Control Assembly (RCCA) or a CEA is disclosed herein. In various aspects, the method may comprise: providing the Rod Cluster Control Assembly (RCCA) or the CEA, the RCCA or the CEA comprising: at least one control rod comprising a clad having an upper end and a lower end; an absorber material housed inside the clad; a spring housed inside the clad; and a plenum housed inside the clad and further inside the spring. In various aspects, the RCCA or the CEA may further comprise a bottom end plug configured to attach to the lower end of the clad; and a top end plug configured to attach to the upper end of the clad. In various aspects, the method may comprise incorporating an axial hole into the top end plug, wherein the axial hole into the top end plug increases a plenum volume of the RCCA or the CEA.

In various aspects, a method for mitigating clad strain in a Rod Cluster Control Assembly (RCCA) or a CEA is disclosed herein. In various aspects, the method may comprise: providing the Rod Cluster Control Assembly (RCCA) or the CEA, the RCCA or the CEA comprising: at least one control rod comprising a clad having an upper end and a lower end; an absorber material housed inside the clad; a spring housed inside the clad; and a plenum housed inside the clad and further inside the spring. In various aspects, the RCCA or the CEA may further comprise a bottom end plug configured to attach to the lower end of the clad; and a top end plug configured to attach to the upper end of the clad. In various aspects, the method may comprise incorporating an axial hole into the bottom end plug, wherein the axial hole into the bottom end plug increases a plenum volume of the RCCA or the CEA.

In various aspects, the method may comprise incorporating radial grooves in the bottom of the absorber material to provide a flow channel for gas expansion or generation to ensure that the lower absorber does not block an opening in the bottom end plug.

In various aspects, a method for mitigating clad strain in a Control Element Assembly (CEA) of a nuclear reactor is disclosed herein. In various aspects, method for mitigating clad strain in the Control Element Assembly (CEA) may comprise one or more, or all the features of the method for mitigating clad strain for the Rod Cluster Control Assembly (RCCA) disclosed herein above.

The methods, devices and systems disclosed herein above may be used in a nuclear reactor, such as a water-cooled nuclear reactor, a light-water reactor (LWR), a heavy-water reactor (HWR), a pressurized water reactor (PWR), a boiling water reactor (BWR), a supercritical water reactor (SCWR), and etc.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Various features of the aspects described herein are set forth with particularity in the appended claims. The various aspects, however, both as to organization and methods of operation, together with advantages thereof, may be understood in accordance with the following description taken in conjunction with the accompanying drawings as follows:

Corresponding reference characters indicate corresponding parts throughout the several views. The exemplifications set out herein illustrate various aspects of the invention, in one form, and such exemplifications are not to be construed as limiting the scope of the invention in any manner.

DETAILED DESCRIPTION

Figure 1:
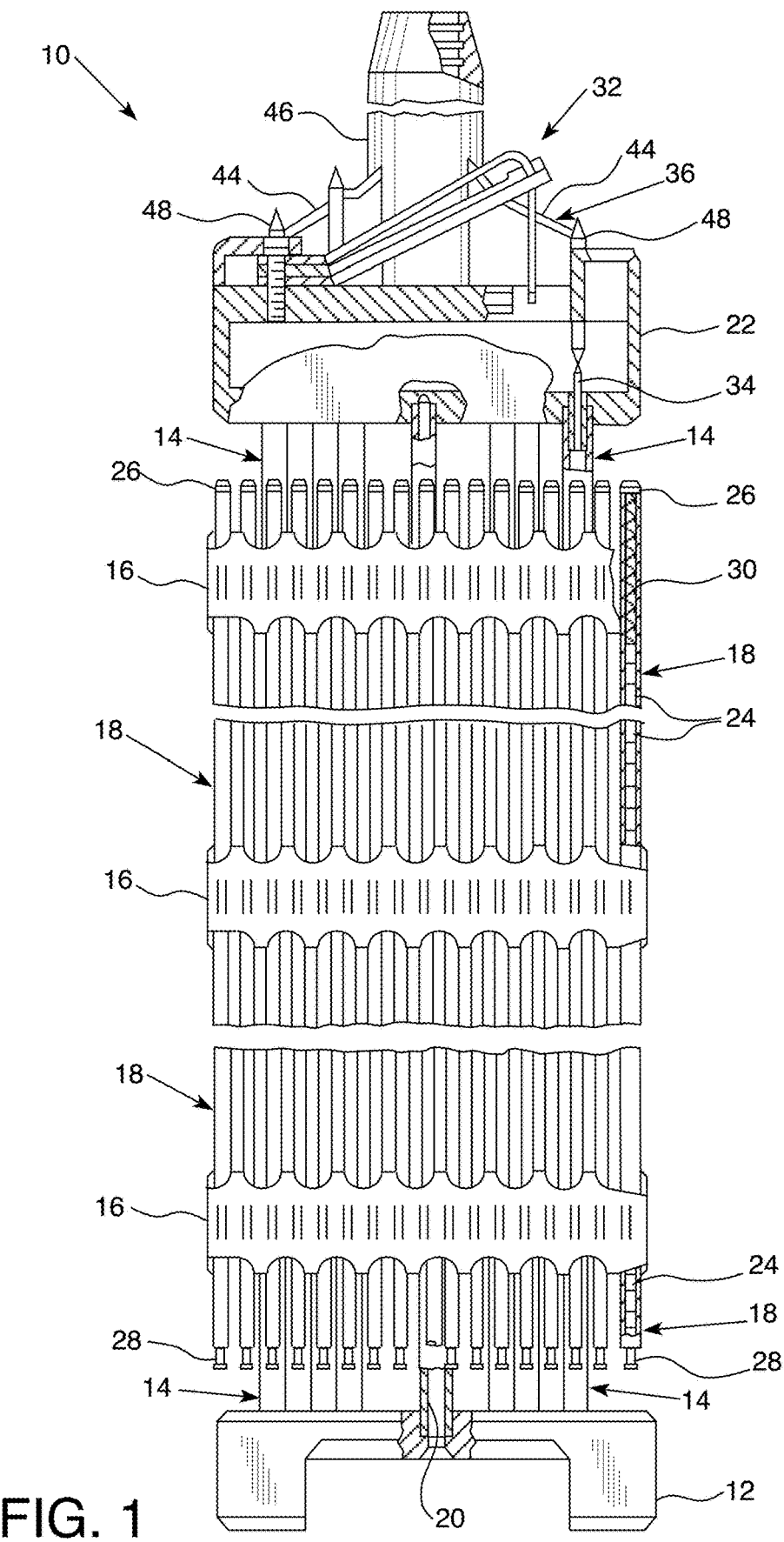
FIG. 1 is a side elevational view, with parts partially sectioned and broken away for purposes of clarify, of a prior art fuel assembly having a prior art control rod spider assembly being disposed above the fuel assembly.

Numerous specific details are set forth to provide a thorough understanding of the overall structure, function, manufacture, and use of the aspects as described in the disclosure and illustrated in the accompanying drawings. Well-known operations, components, and elements have not been described in detail so as not to obscure the aspects described in the specification. The reader will understand that the aspects described and illustrated herein are non-limiting examples, and thus it can be appreciated that the specific structural and functional details disclosed herein may be representative and illustrative. Variations and changes thereto may be made without departing from the scope of the claims. Furthermore, it is to be understood that such terms as "forward", "rearward", "left", "right", "upwardly", "downwardly", "top", "bottom", "upper", "lower", and the like are words of convenience and are not to be construed as limiting terms. In the following description, like reference characters designate like or corresponding parts throughout the several views of the drawings.

Before explaining various aspects of the articulated manipulator in detail, it should be noted that the illustrative examples are not limited in application or use to the details of disclosed in the accompanying drawings and description. It shall be appreciated that the illustrative examples may be implemented or incorporated in other aspects, variations, and modifications, and may be practiced or carried out in various ways. Further, unless otherwise indicated, the terms and expressions employed herein have been chosen for the purpose of describing the illustrative examples for the convenience of the reader and are not for the purpose of limitation thereof.

One common arrangement utilizing control rods in association with a fuel assembly can be seen in U.S. Pat. No. 8,483,346 (the '346 patent) to McCarty et al and U.S. Pat. No. 9,053,824 (the '824 patent) to McCarty et al. This patent shows a control rod spider assembly which includes a plurality of control rods and a spider structure supporting the control rods at their upper ends. A general structure of a typical Rod Cluster Control Assembly (RCCA) is illustrated in FIG. 1. The content of the '346 and '824 patents is hereby incorporated by reference herein in their entirety for all purposes, but only to the extent that the incorporated material does not conflict with existing definitions, statements, or other disclosure material set forth in this disclosure.

Referring now to the drawings, and particularly to FIG. 1, there is shown an elevational view of a nuclear reactor fuel assembly, represented in vertically foreshortened form and being generally designated by the numeral 10. Being the type used in a PWR, the fuel assembly 10 basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 removably attached to the upper ends of the guide thimbles 14 to form an integral assembly capable of being conventionally handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets 24 and the opposite ends of the rod are closed by upper and lower end plugs 26, 28 to hermetically seal the rod. Commonly, a plenum spring 30 is disposed between the upper end plug 26 and the pellets 24 to maintain the pellets in a tight, stacked relationship within tire rod 18. The fuel pellets 24 composed of fissile material are responsible for creating the reactive power of the nuclear reactor. A liquid moderator/coolant such as water, or water containing boron, is pumped upwardly through the fuel assemblies of the core in order to extract heat generated therein for the production of useful work.

Figure 2:
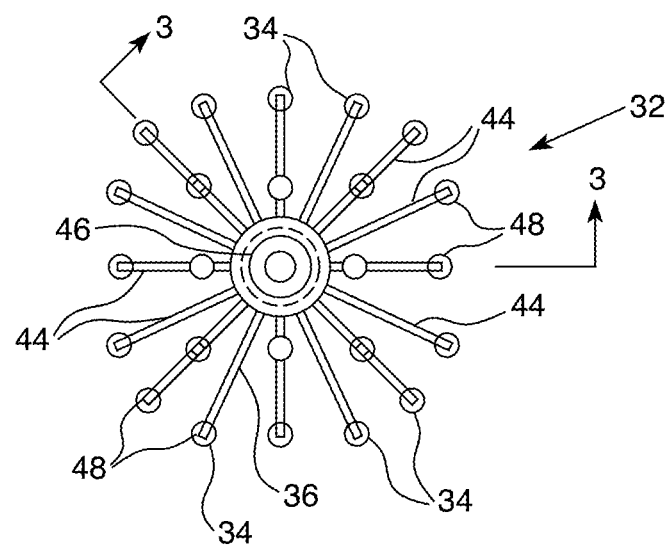
FIG. 2 is a plan view of a control rod spider assembly of the prior art of the type illustrated in FIG. 1.
Figure 3:
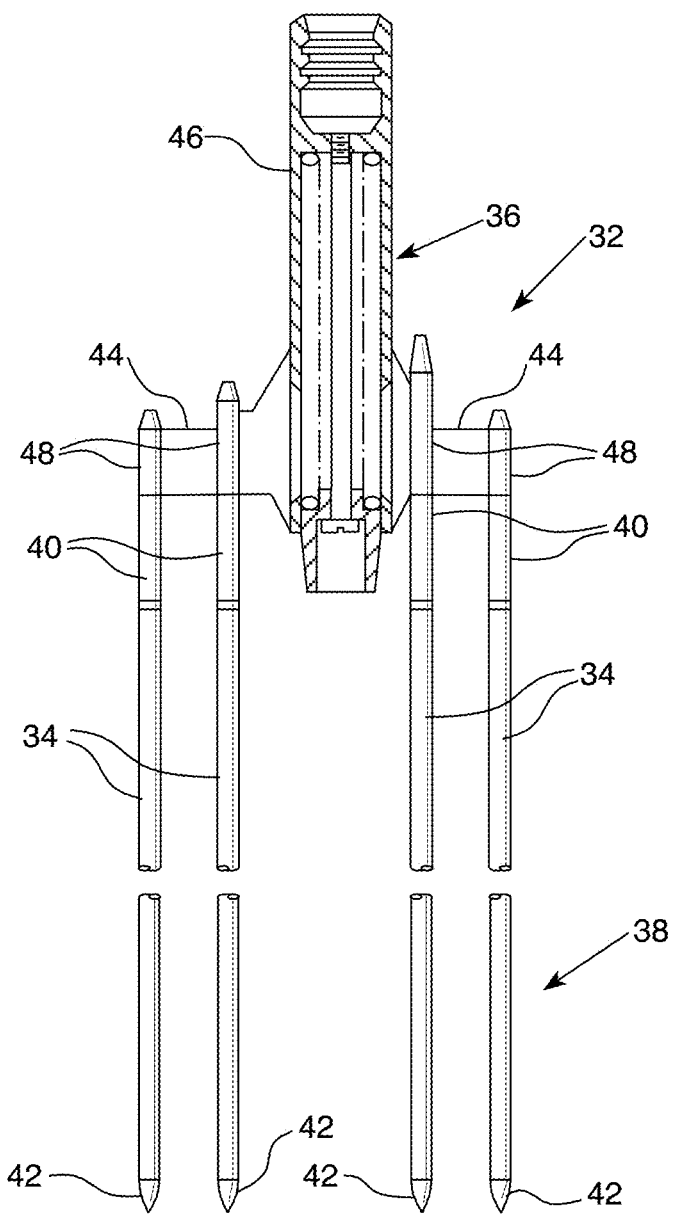
FIG. 3 is an elevational view, with parts partially sectioned, of the control assembly taken along the line 3-3 of FIG. 2.

FIGS. 2 and 3 provide a better view of a conventional control rod spider assembly of the type shown in FIG. 1 and generally designated by reference character 32. In its basic components, the control assembly 32 includes a plurality of control rods 34 and a spider structure 36 which supports the control rods at their upper ends. The spider structure 36 holds the control rods 34 in a pattern matched to that of the guide thimbles 14 which adapts them to be inserted through the top nozzle 22 and downward through the guide thimbles 14 of the PWR fuel assembly 10. The spider structure 36 is connected to a control mechanism (not shown) which is operable in a known manner to move the control rods 34 so as to regulate core power.

In a typical construction, each control rod 34 of the control assembly 32 is composed of an elongated metallic cladding tube 38 having a neutron absorbing material disposed therein and upper and lower end plugs 40, 42 attached at opposite ends of the cladding tube 38 for sealing the absorber material therewithin. The spider structure 36 of the control assembly 32 typically includes a plurality of radially extending flukes or vanes 44 supported on and circumferentially spaced about a central hub 46. Cylindrical shaped control rod connecting fingers 48 are mounted to and supported by the vanes 44. Some of the vanes 44 have only a single connecting finger 48 attached thereon, whereas other vanes 44 have a spaced pair of connecting fingers 48 associated therewith.

In one aspect of the present disclosure, a RCCA and CEA with a powder collection and blockage device between an upper and a lower absorber materials to mitigate clad strain in the high fluence region is disclosed herein.

Rod cluster control assemblies (RCCAs) of nuclear reactor for accident tolerant fuel (ATF) must withstand temperatures resulting from beyond design basis (BDB) accidents which are significantly higher than temperatures experienced during normal operation. These temperatures are too high for RCCAs to incorporate silver-indium-cadmium alloys (Ag—In—Cd) as an absorber material typically used because the melting temperature of Ag—In—Cd is lower than the temperature experienced during the BDB accidents.

Ceramic materials are also used as a RCCA absorber material. Hybrid RCCAs use boron carbide ($B_4C$) material in the upper section of the RCCA (the lowest fluence region of the RCCA). However, Ag—In—Cd material is still used in the lower section (the highest fluence region of the RCCA), with the thermal limitations noted above, because of issues with cracked cladding.

Control element assemblies (CEAs) were produced for combustion engineering plants that had boron carbide ($B_4C$) material located in both the upper section of the CEA (the lowest fluence region) and the lower section (the highest fluence region of the CEA). However, there were operational issues because the powder from $B_4C$ absorber material collected at the bottom of the CEA rod. The powder reduced the effective gap between the clad and absorber material, so there was not enough room for thermal and irradiation expansion of the $B_4C$ absorber material. This resulted in clad strain, and ultimately cracking of the clad during normal operation.

However, the $B_4C$ absorber material will meet the BDB temperature requirements, so a means of preventing powder from accumulating in the high fluence region near the bottom of the RCCA would provide $B_4C$ pellets enough room to accommodate the thermal and irradiation growth without excessive clad strain. This may allow the high temperature (HT) RCCA for the ATF program to replace Ag—In—Cd absorber material in the high fluence lower region with $B_4C$.

A powder collection and blockage device (FIGS. 4 and 5) prevents $B_4C$ powder from the upper section of the control rod from accumulating in the high fluence lower section so the annular gap needed for $B_4C$ thermal and irradiation growth is not restricted.

Figure 4A:
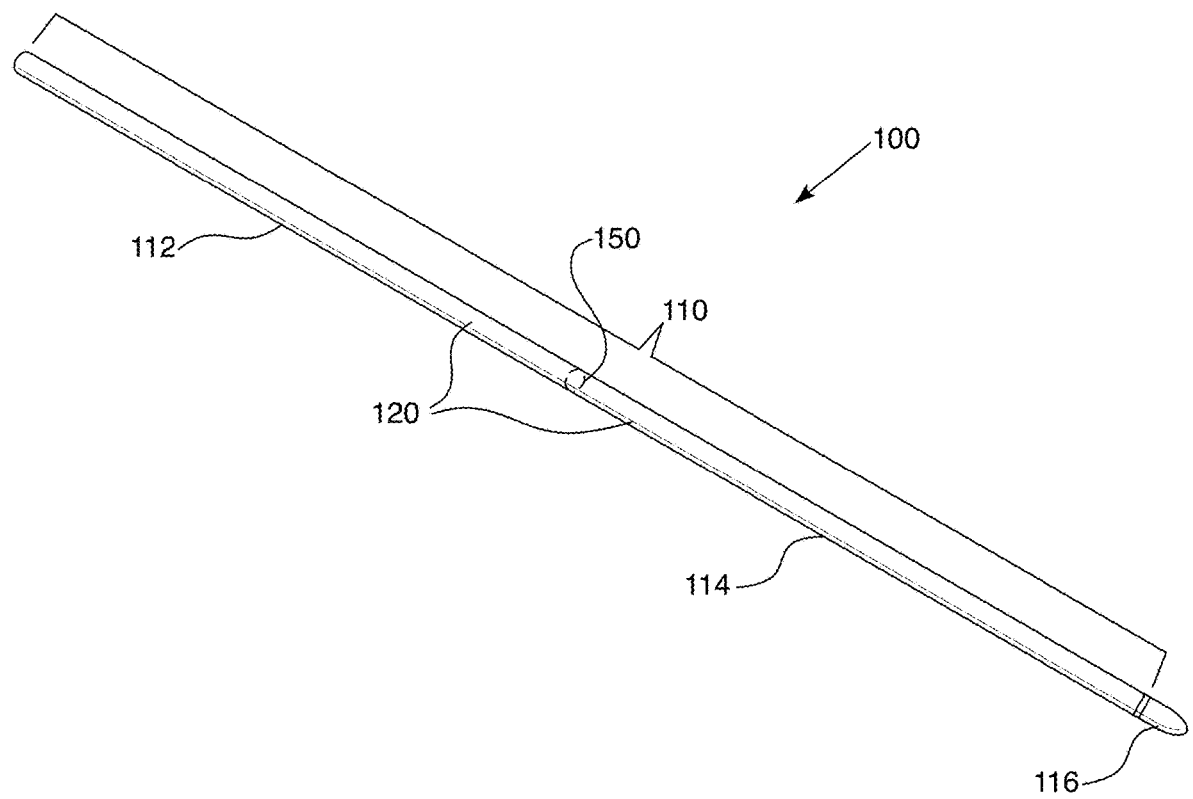
FIGS. 4A and 4B illustrate schematic representation of a powder collection and blockage device inside a clad, in accordance with at least one non-limiting aspect of the present disclosure.
Figure 4B:
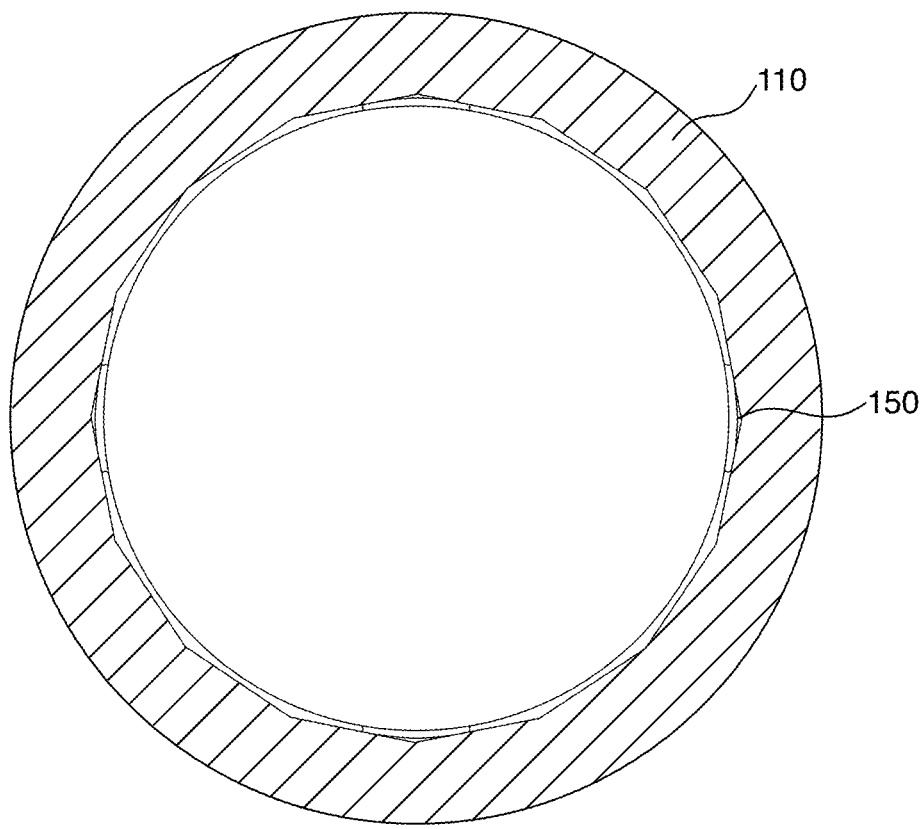

Referring now to FIG. 4, a control rod of the RCCA or CEA is shown in FIGS. 4A and 4B. FIG. 4A shows a control rod 100 comprising a clad 110, an absorber material 120 inside the clad 110, a powder collection and blockage device 150, and a lower end plug 116. The clad 110 includes an upper section 112 and a lower section 114. The powder collection and blockage device 150 is configured to attached to the inside wall of the clad 110. FIG. 4B illustrates a cross-section view of the powder collection and blockage device 150 inside the clad 110.

Figure 5A:
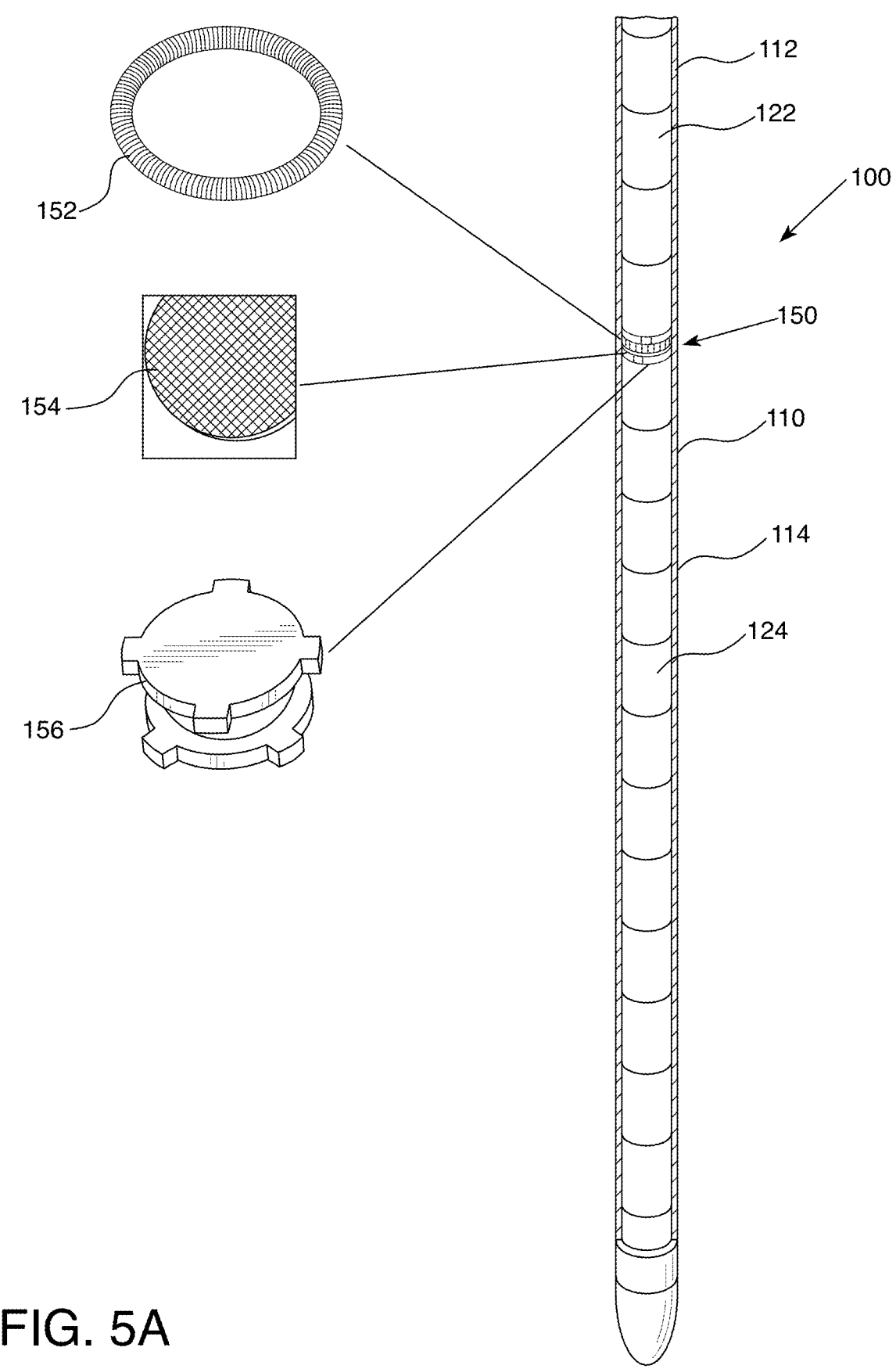
FIGS. 5A and 5B illustrate a cross-section of a powder collection and blockage device inside a clad, in accordance with at least one non-limiting aspect of the present disclosure.
Figure 5B:
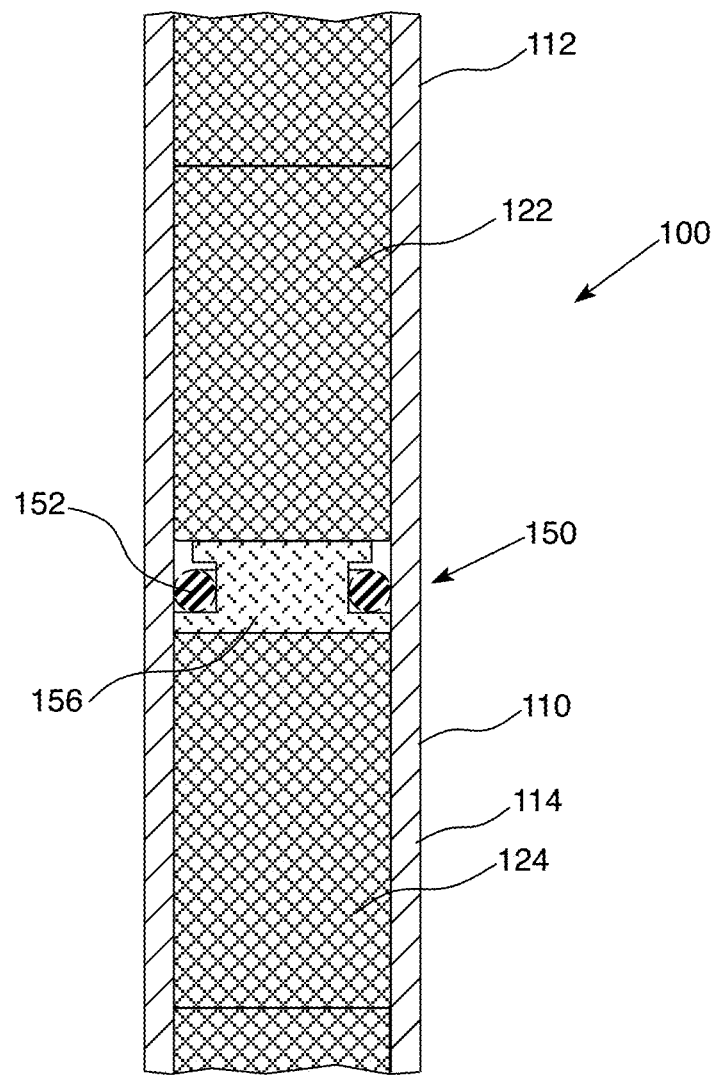

Referring now to FIGS. 5A and 5B, part of a control rod of the RCCA or the CEA with details of the powder collection and blockage device 150 is shown in FIGS. 5A and 5B. FIGS. 5A and 5B show part of a control rod 100 with the powder collection and blockage device 150 inside the clad 110, and further shows the details of the powder collection and blockage device 150. The control rod 100 comprises a clad 110 including an upper section 112 and a lower section 114; an absorber material including an upper absorber material (upper $B_4C$ pellets) 122 housed in the upper section 112 of the clad 110 and a lower absorber material (lower $B_4C$ pellets) 124 housed in the lower section of the clad 114; and the powder collection and blockage device 150. The control rod 100 is configured to have an annular space gap or annular open space (not shown) between the absorber material ($B_4C$ pellets) 120 (122, 124) and the clad 110 (112, 114) to accommodate the strain from the thermal and irradiation growth of the absorber material ($B_4C$ pellets) 120 and/or the clad 110.

Referring again to FIGS. 5A and 5B, the powder collection and blockage device 150 includes a spacer 156, a garter spring 152 and optionally a fine screen mesh 154. The spacer 156 retains the garter spring 152, provides a bearing surface between the upper absorber section 122 and the lower absorber section 124, and provides an open axial space for $B_4C$ powder collection. The garter spring 152 with closely spaced coils prevents the powder from passing from the upper $B_4C$ absorber section 122 to the lower $B_4C$ absorber section 124 but does not prevent backfill gases and gases generated during irradiation from moving through the rod. If the spring coil pitch is too coarse to block the powder, then a fine mesh screen 154 can be included. To compensate for thermal and irradiation expansion of the clad 110 and for clad creep down due to external pressure, the outward force of the garter spring 152 keeps it held tightly against the inside wall of the clad 110 to keep the powder from passing on the outside the garter spring 152. If a screen mesh 154 is needed, the garter spring 152 is configured to keep the screen mesh 154 held tightly against the inside wall of the clad 110 to prevent the formation of gaps.

Several of the powder collection and blockage devices can be used at different axial locations in the control rod to prevent the annular open space from filling with the powder. However, if the annular open space fills and the powder starts to close the annular space gap between the clad and upper absorber material section, the fluence should be low enough in the upper section of the rod above the power collection and blockage device for the clad to accommodate the strain from $B_4C$ thermal and irradiation growth.

The spacer 156 can be stainless steel, or possibly $B_4C$ material if the presence of axial gaps in the absorber material stack does not meet nuclear requirements.

This new method is beneficial for products in development like the HT RCCA or CEA because RCCAs or CEAs for ATF must withstand temperatures resulting from BDB accidents which are significantly higher than temperatures experienced during normal operation. These temperatures are too high for RCCAs or CEAs to incorporate the Ag—In—Cd absorber material typically used because the melting temperature of Ag—In—Cd is lower than the temperature experienced during the BDB.

Swelling in the tip area of RCCAs and CEAs has been an issue in the past. Current hybrid RCCA and CEA designs using $B_4C$ absorber material incorporate Ag—In—Cd absorber material in the lower section of the control rods to accommodate swelling in the region that has highest fluence. However, the RCCAs or the CEAs previously incorporated a design with the $B_4C$ pellets wrapped in "Feltmetal" at the tips to prevent migration of $B_4C$ powder and to offer a crushable substance that would absorb the $B_4C$ swelling without straining the clad. Although the design offered an improvement over just $B_4C$ pellets, it was not as effective as originally thought and control rods in some plants experienced cracking.

The advantage of the powder collection and blockage device as shown in FIGS. 4 and 5 is that it traps and blocks powder from moving into the lower section of the control rods to accommodate absorber swelling in the highest fluence region by having a garter spring that prevent gaps from forming in the annulus between the pellets and clad. If the spring is too coarse to block the powder, then a fine screen can be incorporated (FIGS. 4 and 5).

As disclosed above, the RCCAs or CEAs for ATF must withstand temperatures resulting from BDB accidents which are significantly higher than temperatures experienced during normal operation. These temperatures are too high for RCCAs or CEAs to incorporate the Ag—In—Cd absorber material typically used because the melting temperature of Ag—In—Cd is lower than the temperature experienced during the BDB.

Ceramic materials like $B_4C$ will meet the BDB temperature requirement. However, there have been operational issues with cracked cladding for RCCAs or CEAs with all $B_4C$ material. This is because of $B_4C$ powder from the upper section of the RCCAs or the CEAs accumulating in the highest fluence region near the bottom of the RCCAs or CEAs blocking the annular gap needed for $B_4C$ thermal and irradiation growth.

The powder collection and blockage device is beneficial for new products in development like the HT RCCA or HT CEAs for the ATF program because it mitigates clad strain in the high fluence lower region by blocking ceramic powder from filling the annular gap between the clad and pellets.

Other materials are being considered to replace Ag—In—Cd, and the powder collection and blockage device is beneficial for any ceramic absorber material. However if a material like $B_4C$ can be utilized that has extensive Westinghouse PWR operational experience, significant cost avoidance can be realized by not having to test and characterize new materials. Additionally, the risks associated with incorporating new materials into reactor operation can also be avoided.

In another aspect of the present disclosure, a RCCA or CEA having an end plug extension with increased plenum volume is disclosed herein.

The RCCA or CEA control rods incorporate a plenum region to provide volume for the growth of absorber material due to irradiation and thermal expansion. The plenum also provides volume for expansion of gases at operating temperatures. The gases are introduced during manufacturing or produced when the absorber material is irradiated. Additionally, the plenum also provides for the expansion of absorber material so there will be no clad breach if any absorber material melts due to the high temperatures associated with an accident.

The initial plenum volume is fixed by the geometry of the clad and the absorber materials and is reduced during operation due to the irradiation and thermal expansion of the absorber. Therefore a method to increase plenum volume is beneficial for the RCCA or CEA operation.

Figure 6:
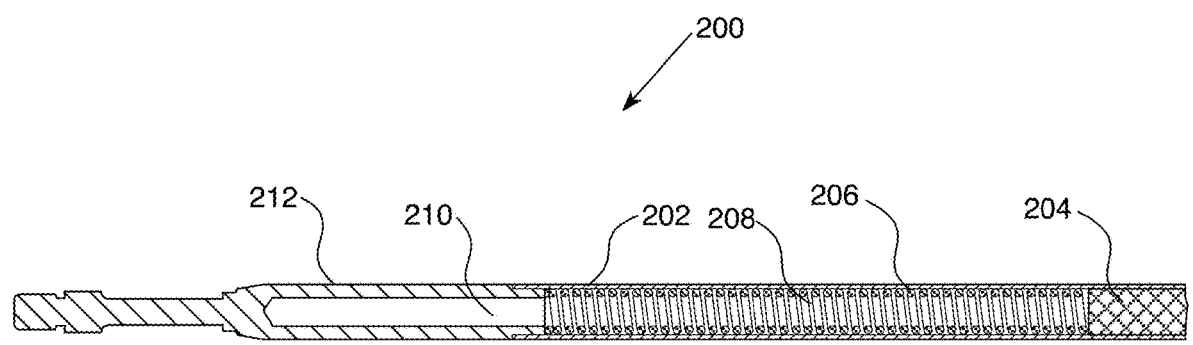
FIG. 6 illustrates an example of a Rod Cluster Control Assembly (RCCA) with increased RCCA plenum volume, in accordance with at least one non-limiting aspect of the present disclosure.

The method shown in FIG. 6 increases the plenum volume by incorporating an axial hole 210 into the top end plug 212. The design is applicable for new RCCAs or CEAs designed to provide the maximum plenum volume possible, and for existing RCCAs or CEAs where additional plenum volume is needed without having to modify existing proven designs for the plenum spring and tube.

Referring to FIG. 6, a partial control rod 200 of the RCCA or CEA is illustrated. The control rod 200 comprises a clad 202, an absorber material 204 inside the clad 202, a top end plug extension 212 configured to attach to the clad 202, an axial hole 210 incorporated into the top end plug extension 212, a spring 206 inside the clad 202, and a plenum 208 inside the clad 202 and further inside the spring 206. The plenum 208 and the spring 206 are configured to be on top of the absorber material 204.

The initial plenum volume is fixed by the geometry of the clad and the absorber materials and is reduced during operation due to the irradiation and thermal expansion of the absorber materials. Therefore a method to increase plenum volume is beneficial for RCCA or CEA operation. The RCCA or CEA with the control rod shown in FIG. 6 increases the plenum volume by incorporating an axial hole into the top end plug and thus has advantages over traditional RCCAs or CEAs.

The new method disclosed above is beneficial for new products in development like the High Temperature RCCA or CEA because these products will require as much plenum volume as possible for the possible melting of absorber material because of the high temperatures experienced during BDB accident conditions.

In another aspect of the present disclosure, a RCCA or CEA with a bottom end plug with increased plenum volume and a lower section absorber material with radial flow channels are disclosed herein.

Many utilities are interested in Flexible Power Operation (FPO) or load follow operation which requires control rod insertion deeper into the active fuel core for longer periods of time, resulting in a smaller plenum than that for typical baseload operation because of additional absorber irradiation growth. Therefore it also beneficial for existing products because the new method provides for additional plenum volume without having to modify proven operational designs for the plenum spring and tube.

The RCCA or CEA control rods incorporate a plenum region to provide volume for the growth of the absorber material due to irradiation and thermal expansion. The plenum also provides volume for expansion of gases at operating temperatures. The gases are introduced during manufacturing or produced when the absorber material is irradiated. Additionally, the plenum also provides for the expansion of the absorber material so there will be no clad breach if any absorber material melts due to the high temperatures associated with a BDB accident.

The initial plenum volume is fixed by the geometry of the clad and absorber materials and is reduced during operation due to the irradiation and thermal expansion of the absorber material. Therefore, a method to increase plenum volume is beneficial for the RCCA or CEA operation.

Figure 7:
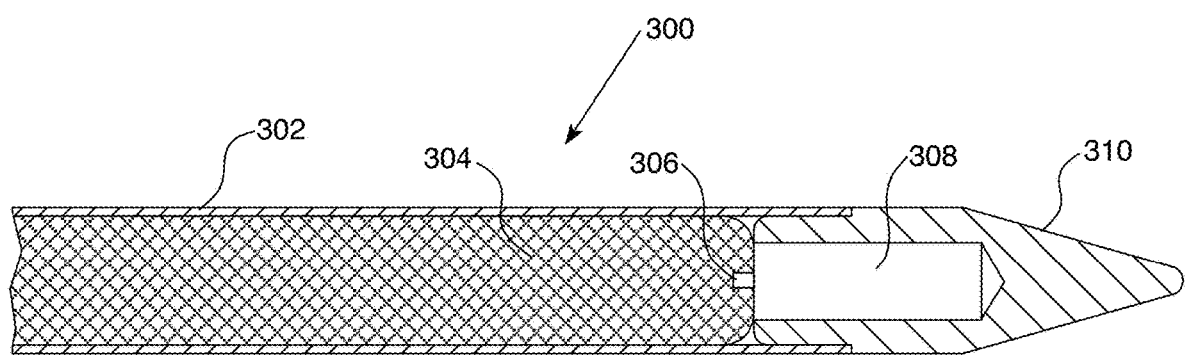
FIG. 7 illustrates another example of a Rod Cluster Control Assembly (RCCA) with increased RCCA plenum volume, in accordance with at least one non-limiting aspect of the present disclosure.

The method shown in FIGS. 7 and 8 increases the plenum volume by incorporating an axial hole 308 into the bottom end plug 310. The design is applicable for new RCCAs or CEAs designed to provide the maximum plenum volume possible, and for existing RCCAs or CEAs where additional plenum volume is needed without having to modify proven designs for the plenum spring and tube.

Figure 8A:
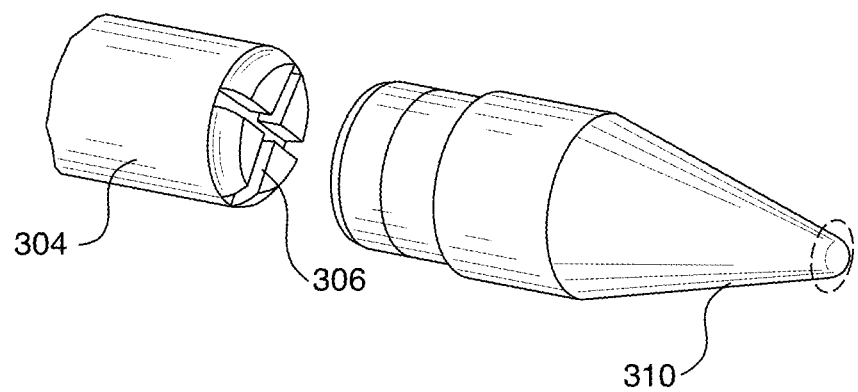
FIGS. 8A and 8B illustrate an example of an axial hole incorporated into the bottom end plug and radial grooves included in the bottom of the lower absorber of the RCCA, in accordance with at least one non-limiting aspect of the present disclosure.
Figure 8B:
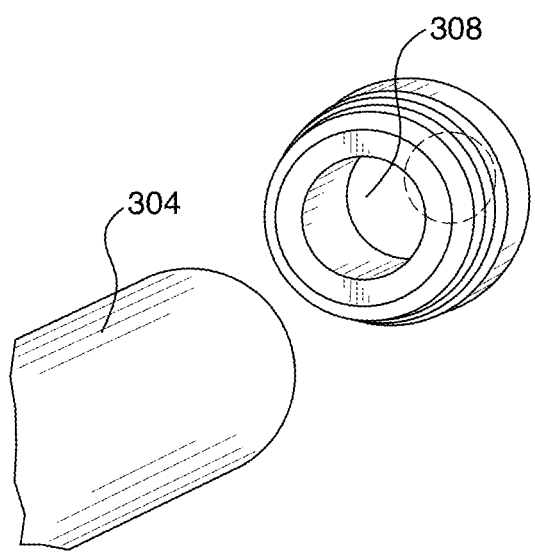

Referring now to FIGS. 7 and 8A and 8B, a partial control rod 300 of a RCCA or CEA is illustrated. The control rod 300 comprises a clad 302, an absorber material 304 with radial grooves 306 in the bottom of the absorber material 304, a bottom end plug 310 configured to attach to the clad 302 with an axial hole 308 incorporated into the bottom end plug 310.

The method shown in FIGS. 7 and 8A and 8B increases the plenum volume by incorporating an axial hole 308 into the bottom end plug 310. Furthermore, radial grooves 306 may optionally be included in the bottom of the lower section absorber material 304 to provide a flow channel for gas expansion or generation to ensure that the lower section absorber material does not block the opening in the bottom end plug as shown in FIGS. 7 and 8A and 8B.

The initial plenum volume is fixed by the geometry of the clad and the absorber materials and is reduced during operation due to the irradiation and thermal expansion of the absorber materials and/or the clad. Therefore, a method to increase plenum volume is beneficial for a RCCA or CEA operation. The method shown in FIGS. 7 and 8A and 8B increases the plenum volume by incorporating an axial hole into the bottom end plug.

This new method is beneficial for new products in development like the High Temperature RCCA or CEA because these products will require as much plenum volume as possible for the possible melting of absorber material because of the high temperatures experienced during BDB accident conditions.

Many utilities are interested in Flexible Power Operation (FPO) or load follow operation which requires control rod insertion deeper into the active fuel core for longer periods of time, resulting in a smaller plenum than for typical baseload operation because of additional absorber irradiation growth. Therefore it also beneficial for existing products because the new method provides for additional plenum volume without having to modify proven operational designs for the plenum spring and tube.

In various aspects, methods, devices and systems for improving the performances of a Rod Cluster Control Assembly (RCCA) and/or a Control Element Assembly (CEA) to mitigate clad strain in the high fluence region during normal operation conditions and accident conditions are disclosed herein. One method may include incorporating a device such as a powder collection and blockage device between an upper and a lower absorber materials of the RCCA and/or CEA. Another method may include increasing the plenum volume by incorporating an axial hole into a top end plug. Another method may include increasing the plenum volume by incorporating an axial hole into the bottom end plug and optionally incorporating radial grooves in the bottom of the lower absorber material to provide a flow channel for gas expansion or generation to ensure that the lower absorber material does not block the opening in the bottom end plug.

In various aspects, a Rod Cluster Control Assembly (RCCA) of a nuclear reactor for mitigating clad strain is disclosed herein.

In various aspects, a Rod Cluster Control Assembly (RCCA) or a CEA of a nuclear reactor may comprise a device which improves the performances of the RCCA or the CEA to mitigate clad strain, for example, the clad strain in the high fluence region of the RCCA or the CEA.

In various aspects, the RCCA or CEA may comprise: at least one control rod including a clad, the clad including a upper section and a lower section. In various aspects, the at least one control rod may comprise an absorber material housed inside the clad, the absorber material comprising an upper absorber material housed inside the upper section of the clad and a lower absorber material housed in the lower section of the clad; and the device. In an embodiment, the device may be housed inside the clad.

In various aspects, the control rod may be configured to have a first space gap or annular gap between the upper material and the clad; and a second space gap or annular gap between the lower absorber material and clad. In an embodiment, the first space gap is the same as the second space gap. These annular space gaps can provide enough room for the thermal and irradiation expansion of the absorber materials including the upper and lower absorber materials.

In various aspects, the device may be a powder collection and blockage device. In an embodiment, the powder collection and blockage device may be housed inside the clad and incorporated into the upper or the lower absorber materials in the clad of the RCCA or CEA. In an embodiment, the powder collection and blockage device may be housed inside the clad between the upper and lower absorber materials.

In various aspects, the RCCA or CEA may further comprise one or more powder collection and blockage devices incorporated into the upper absorber material. In an embodiment, the one or more powder collection and blockage devices may be distributed evenly in the upper absorber material along an axial length of the clad or the at least one control rod. Each of the powder collection and blockage devices collects the powder of the absorber material generated above each of the devices respectively during normal operation time and also during beyond design basis (BDB) accident time of the RCCA or CEA to reduce the accumulation of the powder of the absorber material in bottom end of the clad. In an embodiment, the one or more powder collection and blockage devices may be distributed evenly or at different intervals in the upper absorber material along an axial length of the clad or the at least one control rod.

In various aspects, the RCCA or CEA may further comprise one or more powder collection and blockage devices incorporated into and distributed evenly or at different intervals in the lower absorber material along an axial length of the clad or the at least one control rod.

In various aspects, the RCCA or CEA may further comprise at least one powder collection and blockage device incorporated in the upper absorber material inside the clad; and at least one powder collection and blockage device incorporated in the lower absorber material inside the clad.

In various aspects, the RCCA or CEA may comprise multiple powder collection and blockage devices incorporated into the absorber material inside the clad, and may distributed evenly or at different intervals along the axial length of the clad or the at least one control rod.

In various aspects, the powder collection and blockage device may comprise: a spacer and a garter spring. In an embodiment, the spacer is configured to retain the garter spring, provides a bearing surface between the upper and lower absorber materials, and provides an open axial space for collection of a powder of the upper absorber material generated during normal operation conditions and also accident conditions of the RCCA or CEA. In an embodiment, to compensate for thermal and irradiation expansion of the clad and for clad creep down due to external pressure, an outward force of the garter spring keeps the garter spring held tightly against an inside wall of the clad to keep the powder from passing down in the clad on the outside of the garter spring.

In various aspects, the garter spring may have closely spaced coils and prevents the powder from passing down the clad, for example passing down from the upper section to the lower section of the clad, but does not prevent backfill gases and gases generated during irradiation from moving through the control rod.

In various aspects, the garter spring may have a coarse spring coil pitch which is too coarse to block the powder. In an embodiment, the powder collection and blockage device may further comprise a fine mesh screen. The garter spring is configured to keep the screen mesh to be held tightly against the inside wall of the clad to prevent formation of a cap between the screen mesh and the inside wall of the clad and thus to prevent the powder from passing down the clad, for example, passing down from the upper section to the lower section of the clad on the outside of the garter spring or the screen mesh.

In various aspects, the powder collection and blockage device further comprises a screen mesh configured to be inserted on top of the garter spring, and the garter spring is configured to keep the screen mesh held tightly against the inside wall of the clad to prevent the formation of a gap between the screen mesh and the inside wall of the clad.

In various aspects, the screen mesh has a diameter that closely matches the inner diameter of the clad, and a mesh size fine enough to prevent the powder from passing through it.

In various aspects, the upper absorber material is a ceramic absorber material.

In various aspects, the upper absorber material is boron nitride ($B_4C$).

In various aspects, the lower absorber material is a ceramic absorber material.

In various aspects, the lower absorber material is boron nitride ($B_4C$).

In various aspects, the spacer is made of a material selected from the group consisting of 304 stainless steel, a nickel based alloy, Inconel 625, Inconel 718, a ceramic absorber material, and $B_4C$ absorber material.

In various aspects, the garter spring is made of a material selected from the group consisting of 304 stainless steel, a nickel based alloy, Inconel 625, and Inconel 718.

In various aspects, the screen mesh is made of a material selected from the group consisting of 304 stainless steel, a nickel based alloy, Inconel 625, and Inconel 718.

In various aspects, a Rod Cluster Control Assembly (RCCA) or a CEA of a nuclear reactor for mitigating clad strain is disclosed herein. In various aspects, the RCCA or CEA may comprise: at least one control rod. The at least one control rod comprises a clad, the clad having an upper end and a lower end; an absorber material housed inside the clad; a spring housed inside the clad; and a plenum housed inside the clad and further inside the spring. The RCCA or CEA may further comprise a bottom end plug configured to attach to the lower end of the clad; a top end plug configured to attach to the upper end of the clad; and an axial hole into the top end plug, wherein the axial hole into the top end plug increases a plenum volume of the RCCA or CEA.

In various aspects, a Rod Cluster Control Assembly (RCCA) or a CEA of a nuclear reactor for mitigating clad strain is disclosed herein. In various aspects, the RCCA or the CEA may comprise: at least a control rod. In various aspects, the control rod may comprise a clad including an upper end and a lower end; an absorber material housed inside the clad; a spring housed inside the clad; and a plenum housed inside the clad and further inside the spring. In various aspects, the RCCA or the CEA may further comprise a bottom end plug configured to attach to the lower end of the clad; a top end plug configured to attach to the upper end of the clad; and an axial hole into the bottom end plug, wherein the axial hole into the bottom end plug increases a volume of the plenum.

In various aspects, the Rod Cluster Control Assembly (RCCA) or the CEA may further comprise radial grooves in a bottom of the lower absorber material to provide a flow channel for gas expansion or generation to ensure that the lower absorber material does not block an opening in the bottom end plug.

In various aspects, a Control Element Assembly (CEA) of a nuclear reactor for mitigating clad strain is disclosed herein. In various aspects, the Control Element Assembly (CEA) may comprise one or more, or all the features of the Rod Cluster Control Assembly (RCCA) disclosed herein above.

In various aspects, a method for mitigating clad strain in a Rod Cluster Control Assembly (RCCA) or a CEA of a nuclear reactor is disclosed here. In various aspects, the method may comprise: providing the Rod Cluster Control Assembly (RCCA) or a CEA. In various aspects, the RCCA comprises one or more, or all of the features of the RCCA or the CEA disclosed herein above.

In various aspects, the RCCA or the CEA may comprise: at least one control rod comprising: a clad including a upper section and a lower section; an upper absorber material housed inside the upper section of the clad, a lower absorber material housed in the lower section of the clad. The method may further comprise incorporating a device inside the clad between the upper and lower absorber materials. In various aspects, the device may be a powder collection and blockage device. In various aspects, the powder collection and blockage device may comprise: a spacer; and a garter spring. In various aspects, the spacer retains the garter spring, provides a bearing surface between the upper and lower absorber materials, and provides an open axial space for collection of a powder of the upper absorber material generated during normal operation conditions and accident conditions. In various aspects, the outward force of the garter spring keeps the spacer and the garter spring held tightly against an inside wall of the clad to keep powder from passing on the outside of the garter spring from the upper section to the lower section of the clad. In various aspects, the garter spring has closely spaced coils and prevents the powder from passing from the upper section to the lower section of the clad but does not prevent backfill gases and gases generated during irradiation from moving through the control rod.

In various aspects, the at least one control rod is configured to have an annular space gap between the upper absorber material and an inner wall of the clad; and the same annular space gap between the lower absorber material and the inner wall of the clad.

In various aspects, the method may further comprise incorporating one or more of the powder collection and blockage devices into the upper absorber material inside the upper section of the clad.

In various aspects, the method may further comprise incorporating one or more of the powder collection and blockage devices into the lower absorber material inside the lower section of the clad.

In various aspects, the method may further comprise distributing the powder collection and blockage devices in the absorber material evenly along a length of the clad.

In various aspects, a method for mitigating clad strain in a Rod Cluster Control Assembly (RCCA) or a CEA is disclosed herein. In various aspects, the method may comprise: providing the Rod Cluster Control Assembly (RCCA) or the CEA, the RCCA or the CEA comprising: at least one control rod comprising a clad having an upper end and a lower end; an absorber material housed inside the clad; a spring housed inside the clad; and a plenum housed inside the clad and further inside the spring. In various aspects, the RCCA or the CEA may further comprise a bottom end plug configured to attach to the lower end of the clad; and a top end plug configured to attach to the upper end of the clad. In various aspects, the method may comprise incorporating an axial hole into the top end plug, wherein the axial hole into the top end plug increases a plenum volume of the RCCA or the CEA.

In various aspects, a method for mitigating clad strain in a Rod Cluster Control Assembly (RCCA) or a CEA is disclosed herein. In various aspects, the method may comprise: providing the Rod Cluster Control Assembly (RCCA) or the CEA, the RCCA or the CEA comprising: at least one control rod comprising a clad having an upper end and a lower end; an absorber material housed inside the clad; a spring housed inside the clad; and a plenum housed inside the clad and further inside the spring. In various aspects, the RCCA or the CEA may further comprise a bottom end plug configured to attach to the lower end of the clad; and a top end plug configured to attach to the upper end of the clad. In various aspects, the method may comprise incorporating an axial hole into the bottom end plug, wherein the axial hole into the bottom end plug increases a plenum volume of the RCCA or the CEA.

In various aspects, the method may comprise incorporating radial grooves in the bottom of the absorber material to provide a flow channel for gas expansion or generation to ensure that the lower absorber does not block an opening in the bottom end plug.

In various aspects, a method for mitigating clad strain in a Control Element Assembly (CEA) of a nuclear reactor is disclosed herein. In various aspects, method for mitigating clad strain in the Control Element Assembly (CEA) may comprise one or more, or all the features of the method for mitigating clad strain for the Rod Cluster Control Assembly (RCCA) disclosed herein above.

The use of the devices and methods for mitigating clad strain in a RCCA and a CEA of a nuclear reactor disclosed herein could result in improved safety and reduced risk, improved production continuity, and many millions of dollars per year in production cost reductions and over current RCCA and CEA devices and methods.

All patents, patent applications, publications, or other disclosure material mentioned herein and/or listed in any Application Data Sheet, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present invention has been described with reference to various exemplary and illustrative aspects. The aspects described herein are understood as providing illustrative features of varying detail of various aspects of the disclosed invention; and therefore, unless otherwise specified, it is to be understood that, to the extent possible, one or more features, elements, components, constituents, ingredients, structures, modules, and/or aspects of the disclosed aspects may be combined, separated, interchanged, and/or rearranged with or relative to one or more other features, elements, components, constituents, ingredients, structures, modules, and/or aspects of the disclosed aspects without departing from the scope of the disclosed invention. Accordingly, it will be recognized by persons having ordinary skill in the art that various substitutions, modifications or combinations of any of the exemplary aspects may be made without departing from the scope of the invention. In addition, persons skilled in the art will recognize, or be able to ascertain using no more than routine experimentation, many equivalents to the various aspects of the invention described herein upon review of this specification. Thus, the invention is not limited by the description of the various aspects, but rather by the claims.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.05% of a given value or range.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all sub-ranges subsumed within the recited range. For example, a range of "1 to 100" includes all sub-ranges between (and including) the recited minimum value of 1 and the recited maximum value of 100, that is, having a minimum value equal to or greater than 1 and a maximum value equal to or less than 100. Also, all ranges recited herein are inclusive of the end points of the recited ranges. For example, a range of "1 to 100" includes the end points 1 and 100. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

What is claimed is:

1. A Rod Cluster Control Assembly (RCCA) for mitigating clad strain, the RCCA comprising:
   a control rod comprising:
      a clad tube comprising an upper section and a lower section, wherein the clad tube defines an inner wall;
      an upper absorber material housed inside the upper section of the clad tube; and
      a lower absorber material housed inside the lower section of the clad tube;
      wherein the control rod is configured to have a first annular gap between the upper absorber material and the inner wall of the clad tube and a second annular gap between the lower absorber material and the inner wall of the clad tube; and
   a device positioned inside the clad tube between the upper absorber material and the lower absorber material, the device comprising:
      a garter spring configured to exert an outward force against the inner wall of the clad tube, wherein the garter spring comprises coils configured to prevent powder generated from the upper absorber material from passing to the lower section of the clad tube, and wherein the coils are further configured to allow gases to pass between the upper section of the clad tube and the lower section of the clad tube; and
      a spacer configured to retain the garter spring, wherein the spacer is further configured to provide a bearing surface for the upper absorber material, and wherein the spacer defines axial openings for collecting the powder generated by the upper absorber material.

2. The RCCA of claim 1, wherein the upper absorber material is a ceramic absorber material.

3. The RCCA of claim 1, wherein the upper absorber material is boron carbide ($B_4C$).

4. The RCCA of claim 1, wherein the lower absorber material is a ceramic absorber material.

5. The RCCA of claim 1, wherein the lower absorber material is boron carbide ($B_4C$).

6. The RCCA of claim 1, wherein the spacer comprises at least one of 304 stainless steel, a nickel based alloy, Inconel 625, Inconel 718, a ceramic absorber material, or $B_4C$ absorber material.

7. The RCCA of claim 1, wherein the garter spring comprises at least one of 304 stainless steel, a nickel based alloy, Inconel 625, or Inconel 718.

8. The RCCA of claim 1, further comprising a plurality of the devices, wherein each of the devices are positioned inside the clad tube.

9. The RCCA of claim 8, wherein the devices are distributed along an axial length of the clad tube.

10. The RCCA of claim 1, wherein the first annular gap comprises a first gap width, wherein the second annular gap comprises a second gap width, and wherein the first gap width is the same as the second gap width.

11. The RCCA of claim 1, wherein the control rod further comprises a spring positioned inside the upper section of the clad tube above the upper absorber material, wherein the spring forms a plenum above the upper absorber material, wherein the plenum comprises a plenum volume, wherein the RCCA further comprises a top end plug extension configured to attach to an upper end of the upper section of the clad tube and wherein the top end plug comprises an axial hole configured to increase the plenum volume.

12. The RCCA of claim 1, wherein the control rod further comprises a plenum region formed inside of the lower section of clad tube and around the lower absorber material, wherein the plenum region has a plenum volume; wherein the RCCA further comprises a bottom end plug configured to attach to a lower end of the lower section of the clad tube, and wherein the bottom end plug comprises an axial hole configured to increase the plenum volume.

13. The Rod Cluster Control Assembly (RCCA) of claim 12, wherein a portion of the lower absorber material proximate to the end of the lower section of the clad tube comprises radial grooves formed therein, wherein the radial grooves are configured to allow gas to flow into the axial hole.

14. The Rod Cluster Control Assembly (RCCA) of claim 12, further comprising a top end plug extension configured to attach to an upper end of the upper section of the clad tube, wherein the axial hole is a first axial hole, and wherein the top end plug extension comprises a second axial hole configured to increase the plenum volume.

15. The RCCA of claim 1, wherein the axial openings comprise circumferentially spaced openings, and wherein the spacer comprises spoked projections defining the circumferentially spaced openings.

16. The RCCA of claim 15, wherein the spacer comprises an upper disc, a lower disk, and a body extending between the upper disc and the lower disc, wherein the spacer is retained by the garter spring between the upper disc and the lower disc, and wherein the upper disc comprises the circumferentially spaced openings.

17. The RCCA of claim 16, wherein the device further comprises a screen mesh positioned on top of the garter spring, and wherein the screen mesh is configured to prevent the powder generated from the upper absorber material from passing to the lower section of the clad tube.

18. The RCCA of claim 17, wherein the screen mesh comprises at least one of 304 stainless steel, a nickel based alloy, Inconel 625, or Inconel 718.

19. A control rod comprising:
   a clad tube comprising an upper section and a lower section, wherein the clad tube defines an inner wall;
   an upper absorber material housed inside the upper section of the clad tube; and
   a lower absorber material housed inside the lower section of the clad tube, wherein the control rod is configured to have a first annular gap between the upper absorber material and the inner wall of the clad tube and a second annular gap between the lower absorber material and the inner wall of the clad tube;
   a spacer positioned inside the clad tube between the upper absorber material and the lower absorber material, the spacer comprising:
      an upper disc, wherein the upper disc comprises axial openings for collecting powder from the upper absorber material;
      a lower disc; and
      a body extending between the upper disc and the lower disc; and a garter spring retained between the upper disc and the lower disc, wherein the garter spring comprises coils configured to prevent the powder collected by the axial openings from passing to the lower section of the clad tube, and wherein the coils are further configured to allow gases to pass between the upper section of the clad tube and the lower section of the clad tube.

20. The control rod of claim 19, wherein the upper disc comprises spoked projections defining the axial openings.

* * * * *